United States Patent
Stephen

(10) Patent No.: US 6,327,763 B2
(45) Date of Patent: Dec. 11, 2001

(54) ALIGNMENT TOOL

(75) Inventor: Robert Stephen, Aberdeenshire (GB)

(73) Assignee: Future Alignments Ltd., Ellon (GB)

( * ) Notice: Subject to any disclaimer, the term of this patent is extended or adjusted under 35 U.S.C. 154(b) by 0 days.

(21) Appl. No.: 09/230,994

(22) PCT Filed: Aug. 7, 1997

(86) PCT No.: PCT/GB97/02135

§ 371 Date: Mar. 17, 1999

§ 102(e) Date: Mar. 17, 1999

(87) PCT Pub. No.: WO98/05893

PCT Pub. Date: Feb. 12, 1998

(30) Foreign Application Priority Data

Aug. 7, 1996 (GB) .................................................. 9616579
Apr. 1, 1997 (GB) .................................................. 9706631

(51) Int. Cl.[7] .................................................. B25B 27/14
(52) U.S. Cl. .................................. 29/272; 29/271; 269/43
(58) Field of Search ............................... 269/43; 29/272, 29/237, 267, 238; 228/49.3; 254/29 R

(56) References Cited

U.S. PATENT DOCUMENTS

| 662,342 | * 11/1900 | Berry ..................................... 29/272 |
| 1,985,152 | * 12/1934 | Crockett ................................. 29/272 |
| 2,638,676 | 5/1953 | Callahan . |
| 3,015,883 | 1/1962 | Brown . |
| 3,318,592 | 5/1967 | Steffen . |
| 3,807,017 | 4/1974 | Une et al. . |
| 4,263,084 | 4/1981 | Takala . |
| 4,555,841 | * 12/1985 | James ................................... 228/49.3 |
| 4,674,730 | 6/1987 | Roberts . |
| 4,722,468 | * 2/1988 | McClure ............................... 29/272 |
| 4,872,709 | * 10/1989 | Stack ..................................... 29/272 |
| 4,893,393 | * 1/1990 | Marshall ............................... 29/272 |
| 5,129,136 | 7/1992 | Richardson . |
| 5,560,091 | * 10/1996 | Labit ..................................... 29/272 |
| 5,640,748 | * 6/1997 | Harrison ............................... 29/272 |
| 5,832,582 | * 11/1998 | Stepen et al. ......................... 29/272 |

FOREIGN PATENT DOCUMENTS

| 55840/73 | 7/1975 | (AU) . |
| 523 980 | 4/1931 | (DE) . |
| 39 370 94 A1 | 5/1990 | (DE) . |
| 40 130 19 A1 | 10/1991 | (DE) . |
| G 92 07 334.4 | 1/1993 | (DE) . |
| G 93 07 957.5 | 9/1993 | (DE) . |
| 0456123 A1 | 11/1991 | (EP) . |
| 2 004 964 A | 4/1979 | (GB) . |
| 5 177557 | 7/1993 | (JP) . |

* cited by examiner

Primary Examiner—Robert C. Watson
(74) Attorney, Agent, or Firm—Ratner & Prestia

(57) ABSTRACT

An alignment tool (10) for aligning two individual conduits (14, 18), the conduits having flanged ends with bolt holes passing therethrough. In the preferred embodiment, the alignment tool (10) is hand operated using a lever (24) and appropriate pivot points. In an alternative embodiment, a hydraulic cylinder is used such that larger conduits may be aligned.

11 Claims, 3 Drawing Sheets

ALIGNMENT TOOL

This application is the U.S. national phase application of PCT International Application No. PCT/GB97/02135 filed Aug. 7, 1997.

The present invention relates to an alignment tool.

When joining two lengths of pipe it is very often difficult to align correctly the flanged ends of the pipes before a joint can be made. The joint can require a high degree of accuracy in terms of conduit alignment, in order to provide the requisite strength and reliability from the joint.

Traditional methods for bringing the flanged ends of such conduits into alignment include the use of crow bars, steel podgers and fox wedges. However, these methods cause damage to the steel work and pipes surrounding the joint. In addition these methods tend to be of a trial and error nature and as such are very often inaccurate and unreliable.

Other such methods for alignment include the use of chain blocks, pull lifts, tirfors, jacks, cranes or the like. These methods require anchor points in the direction in which misalignment has occurred. For example, if the misalignment is in the vertical direction, an anchor point vertically above the joint is required. This tends to be difficult to achieve in practice when the displacement between the two flanged pipes may only be in the order of a few millimeters.

In accordance with a first aspect of the present invention there is provided an alignment tool comprising a first coupling device having means for engaging a first conduit, a second coupling device having means for engaging a second conduit and a lever, the coupling devices being coupled to the lever, wherein movement of the lever when the first and second coupling devices are engaged with the respective conduits causes relative movement of the coupling devices to align the adjacent ends.

In a preferred embodiment, the first and second coupling devices are movable between different spaced-apart locations on the tool.

Typically, the tool has a handle on the lever to facilitate hand-operation of the tool. Preferably, the handle is fixed at or near one end of the lever, and the coupling devices are coupled to the lever at or near the other end.

Alternatively, an actuation piston is disposed between the lever and one of the coupling devices, and causes movement of the lever upon actuation of the piston.

Typically, the coupling devices are pivotally coupled to the lever.

In accordance with a second aspect of the present invention there is provided an alignment tool comprising a first coupling device having means for engaging a first conduit, a second coupling device having means for engaging a second conduit and a plate connecting the two devices together, wherein relative movement of the first and second coupling devices urges movement of the conduits to align their ends.

Typically, movement of the first coupling device is actuated by a hydraulic cylinder.

In a preferred embodiment, the tool includes stabilising means which abuts a part of one of the conduits. Preferably, the stabilising means comprises a brace which is slidably mounted in a sleeve, the brace having at one end a surface for contacting one of the conduits. Typically, the stabilising means is locked in position by an annular ring which is screw-threaded.

Typically also, the surface is curved to conform to the exterior of the conduit.

In a preferred embodiment, the first and second coupling devices are capable of moving relative to one another. Typically, the relative movement results in the first coupling device moving downwards and the second coupling device moving upwards.

Typically, the first coupling device comprises a surface which is typically planar and is adapted to contact the other conduit.

Preferably, the first coupling device comprises a movable surface, such as a rotatable wheel or a pivot point.

Typically, the second coupling device is adapted to fit into a bolt hole in a flange on the end of the first conduit.

Preferably, the conduits comprise metal pipe.

Embodiments of the present invention will now be described, by way of example only, with reference to the accompanying drawings in which.

Figure 1:
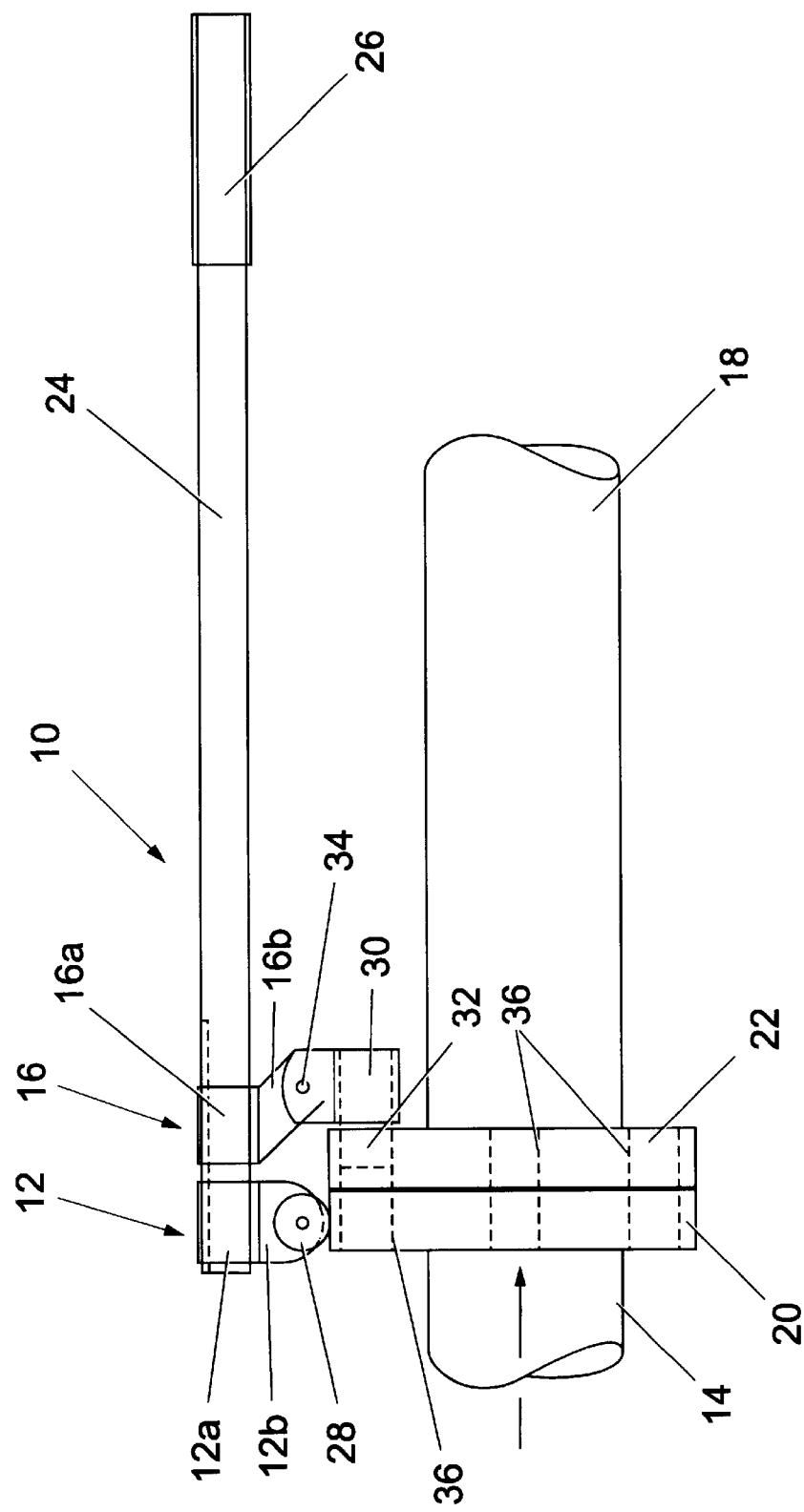
FIG. 1 is a side elevation of an alignment tool according to a first aspect of the present invention, designed to be operated by hand.

Referring firstly to FIG. 1, there is shown an alignment tool, generally designated 10, which includes a first coupling device 12 for engaging a first conduit 14 which is provided with a first fixing flange 20. A second coupling device 16 engages a second conduit 18 having a corresponding second fixing flange 22. The second conduit 18 is to be firstly aligned with and then joined to the first conduit 14.

The first and second coupling devices 12, 16 are coupled to a lever 24 at one end thereof, using any suitable means, for example by rivetting or screws. In practice, the first and second coupling devices 12, 16 are coupled using, for example, butterfly screws such that the devices 12, 16 may be moved along the lever. This movement allows for varying sizes of pipe to be used in the tool, without the necessity of having a specified tool for a particular diameter of pipe.

The lever 24 is provided with a handle 26 at the other end, the handle 26 facilitating operation of the tool 10 by hand.

The first coupling device 12 comprises a collar 12a which has a bracket 12b extending perpendicular to the longitudinal axis of the lever 24. Rotatably mounted at one end of the bracket 12b is a lever wheel 28. The lever wheel 28 abuts either the first fixing flange 20 of the first conduit 14 or the conduit 14 itself. It will be appreciated that the lever wheel 28 may be replaced by any suitable flat surface which is capable of providing a pivot point.

The second coupling device 16 includes a second collar 16a which has a leg 16b extending therefrom in a direction perpendicular to the longitudinal axis of the lever 24. A sleeve 30 is pivotally connected to the leg 16b of the second coupling device 16 using a hinge 34.

In this embodiment, a dowel 32 is inserted into, and secured within, the sleeve 30. The dowel 32 extends in a direction parallel to the lever 24 and is engaged by a bolt hole 36. A plurality of such bolt holes 36 are used to secure the two flanges 20, 22 together once correctly aligned.

In use, an operator will hold handle 26 and exert an upward force on the lever 24. The tool 10 pivots about the point of contact between the lever wheel 28 and the first fixing flange 20 of the first conduit 14, forcing the first conduit 14 down. Simultaneously, the force generated by the pivoting movement at the lever wheel 28 will pull the second coupling device 16 (and the second conduit 18) upwards, bringing the bolt holes 36 into alignment for subsequent joining.

It will be generally appreciated that it is possible to change the positions of the first and second coupling devices 12, 16 such that the first coupling device 12, is closer to the handle 26. In this particular embodiment, the operator will be required to push down on the handle, as opposed to pulling upwards.

The first coupling device 12 will provide the same pivotal motion as before, thereby pushing down on the second conduit 18. The combination of the downward force and the pivotal motion at the pivot point will cause the second coupling device 16 to pull the first conduit 14 upwards and thereby align the two flanges 20, 22 for subsequent joining.

Figure 2:
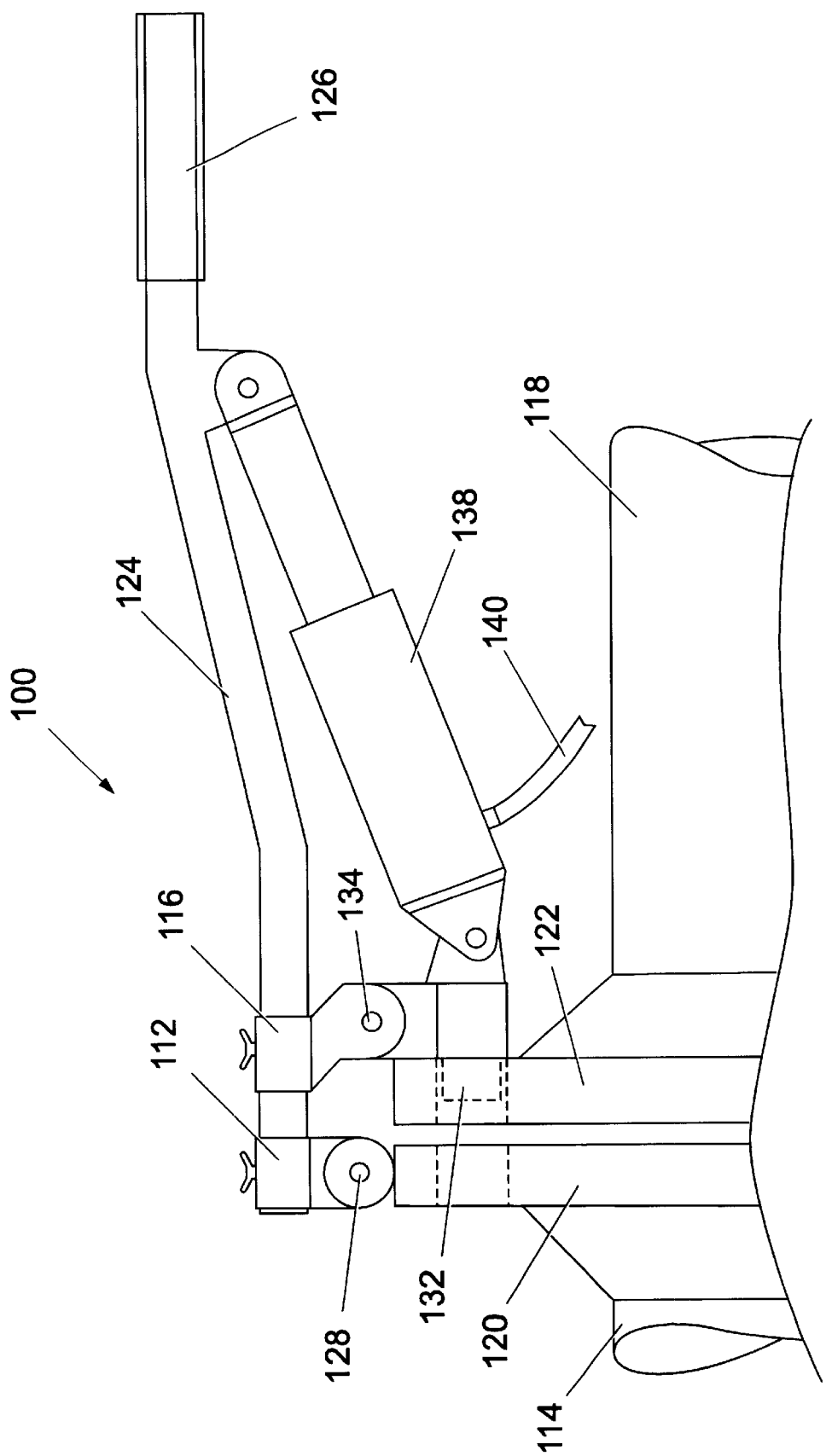
FIG. 2 is a side elevation of an alternative form of alignment tool, designed to be operated hydraulically.

FIG. 2 shows an alternative embodiment of alignment tool 100. In this example, the overall structure remains the same, except that the actuation of the lever 124 is by way of an actuation cylinder 138. In use, hydraulic fluid, for example oil, is pumped into the cylinder 138 through a hose 140.

Expansion of the cylinder 138 will cause the lever 124 to move upwards and relative movement of the first coupling device 112 with respect to the second coupling device 116 will be initiated. As with the previous embodiment, the first coupling device 112 will provide a pivot point and will force the first flange 120 downwards. The pivoting motion of the first coupling device 112 will cause the send coupling device 116 to move upwards, thereby aligning the two flanges 120, 122 of the conduits 114, 118.

Using this variation of the tool allows larger conduits to be aligned as the operation of the tool 100 is no longer dependent upon the strength of the operator.

Figure 3:
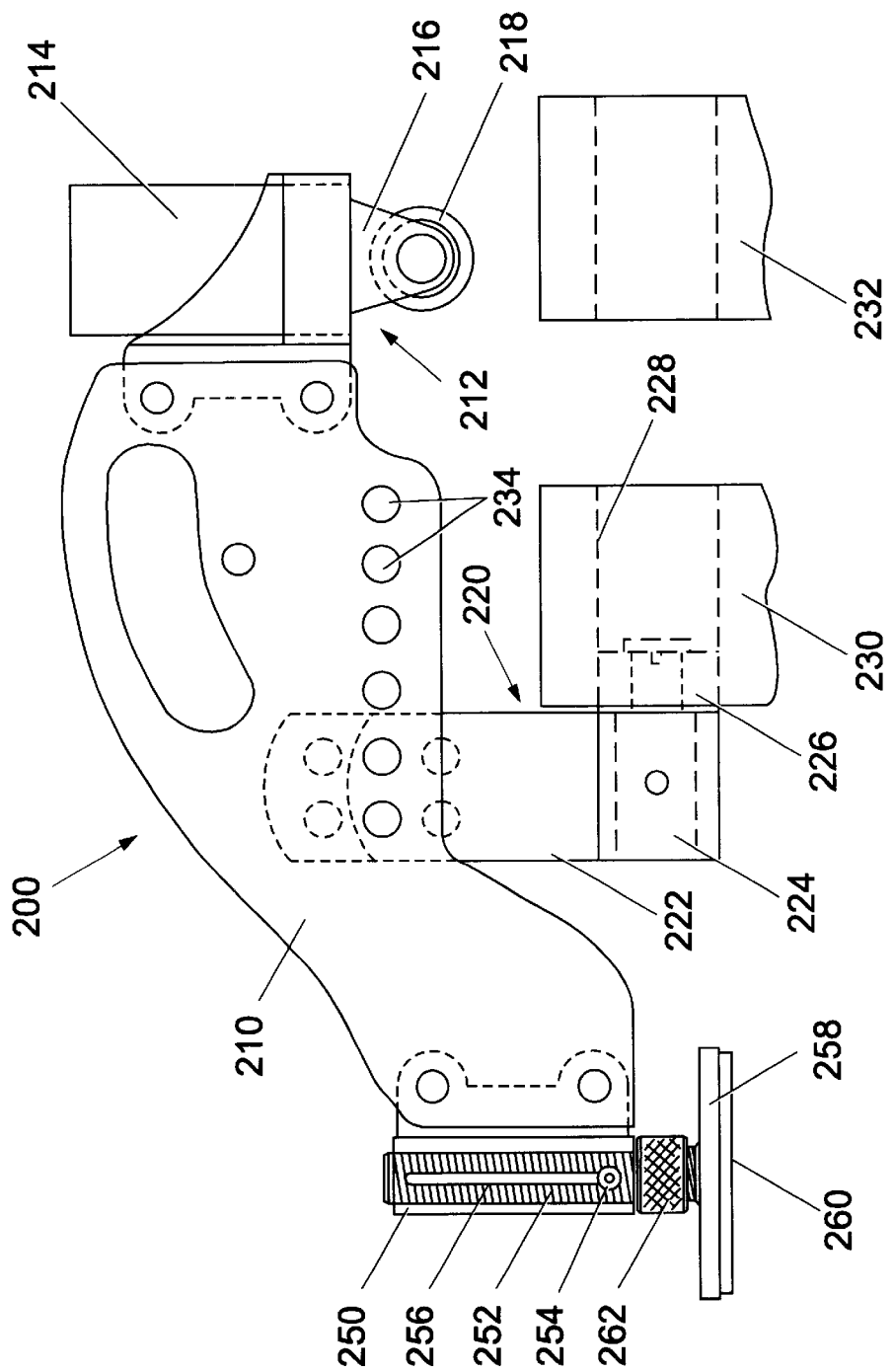
FIG. 3 is a side elevation of an alignment tool according to the second aspect of the present invention.

FIG. 3 shows a second aspect of the present invention. In this embodiment, the alignment tool 200 comprises a mounting plate 210, which has a stabiliser 250 coupled at one end.

The stabiliser 250 comprises a screw threaded central brace 252 which is slidably mounted within the stabiliser 250. A bolt 254 engages a slot 256 in the central brace 252 allowing the brace 252 to move vertically within the stabiliser 250.

A stabilizing plate 258 is coupled to the lower end of the brace 252 to provide a contact point with one of the conduits to be joined. In order to further improve the stability of the device 200, the under surface 260 of the plate 258 may be substantially curved such that the curved surface of the conduit is cradled by the surface 260.

In use, a knurled ring 262 which has an internal screw thread of the opposite hand of the thread on the brace 252, is turned in a first direction. The turning motion loosens the grip of the ring 262 on the brace 252 allowing the brace 252 to move vertically.

The brace 252 is lowered until the plate 258 rests against the surface of one of the conduits. The ring 262 is then screwed in the opposite direction which locks the brace 252 in position. The alignment tool 200 is then substantially stabilized.

A first coupling device 212 is coupled at the opposite end of the mounting plate 210. A hydraulic cylinder 214 is directly coupled to the mounting plate 210 which permits the first coupling device 212 to move vertically. A bracket 216 is coupled to the lower end of the cylinder 214 and has a lever wheel 218 rotatably mounted to it. The wheel 218 may be replaced by any suitable flat surface, such as a skid for example, which is capable of providing a suitable pivot point.

Mounted between the stabiliser 250 and the first coupling device 212 is a second coupling device 220. The second device comprises a leg 222 which extends vertically downwards. Located at the bottom of the leg 222 is a receptacle 224. A locating dowel 226 is slidably coupled to the receptacle 224 such that the dowel 226 may slide in a substantially horizontal direction.

In use, the dowel 226 is located into a bolt hole 228 on a first flange 230 of the first conduit. The stabilizer 250 is then lowered into position, as described above. Activating the hydraulic cylinder 214 lowers the lever wheel 218 of the first coupling device 212 until the wheel 218 contacts a second flange 232 of a second conduit.

The contact between the wheel 218 and the second flange 232 provides a reaction point, where the continual lowering of the first coupling device 212 provides a downward force on the second flange 232. This downward force causes an opposite upward force to be exerted on the first flange 230 by the second coupling device 220. The opposite forces on the first flange 230 and the second flange 232 brings them into alignment so that the flanges 230, 232 may be joined using conventional means such as a plurality of bolts (not shown).

As can be seen from FIG. 3, a plurality of locating holes is provided such that the second coupling device 220 may be moved horizontally along the mounting plate 210. This movement allows the tool 200 to be used with a variety of conduits with varying sizes of flanges. It a will be appreciated that the first coupling device 212 may also be replaced with a device which has, for example, a larger actuation cylinder such that larger conduits may be aligned.

Hence, the present invention provides an alignment tool which gives a more controlled alignment of two conduits and gives improved precision over prior art methods. Furthermore, the tool does not damage the conduits or structures as no anchor points outwith the immediate vicinity are required.

Modifications and improvements may be made to the foregoing without departing from the scope of the invention.

What is claimed is:

1. An alignment tool comprising a first coupling device having means for engaging a first conduit, a second coupling device having means for engaging a second conduit and a lever, the coupling devices being coupled to the lever, wherein movement of the lever when the first and second coupling devices are engaged with the respective conduits causes relative movement of the coupling devices to align the conduits, wherein at least one of the means for engaging a respective conduit provides a pivot point about which the coupling device can pivot relative to a respective conduit to direct substantially all of the reaction force generating said relative movement in a direction perpendicular to a longitudinal axis of the conduit, and wherein the first and second coupling devices are slidable on the lever.

2. An alignment tool as claimed in claim 1, wherein the first and second coupling devices are movable between different spaced-apart locations on the tool.

3. An alignment tool as claimed in claim 1, wherein the tool has a handle on the lever to facilitate hand-operation of the tool.

4. An alignment tool as claimed in claim 3, wherein the handle is fixed at or near one end of the lever, and the coupling devices are coupled to the lever at or near the other end.

5. An alignment tool as claimed in claim 1, wherein an actuation piston is disposed between the lever and one of the coupling devices, and causes movement of the lever upon actuation of the piston.

6. An alignment tool as claimed in claim 1, wherein the coupling devices are pivotally coupled to the lever.

7. An alignment tool as claimed in claim claim 1, wherein the first and second coupling devices are capable of moving relative to one another.

8. An alignment tool as claimed in claim 7, wherein the relative movement results in the first coupling device moving downwards and the second coupling device moving upwards.

9. An alignment tool as claimed in claim 1, wherein the first coupling device comprises a surface which is typically planar and is adapted to contact the other conduit.

10. An alignment tool as claimed in claim 1, wherein the first coupling device comprises a movable surface.

11. An alignment tool as claimed in claim 1, wherein the second coupling device is adapted to fit into a bolt hole in a flange on the end of the first conduit.

* * * * *